United States Patent [19]

Young et al.

[11] Patent Number: 5,557,986
[45] Date of Patent: Sep. 24, 1996

[54] DIFFERENTIAL MECHANISM

[75] Inventors: Alastair J. Young; John Spooner, both of Kenilworth; John P. Chippendale, Solihull, all of Great Britain

[73] Assignee: Automotive Products, plc, Leamington Spa, England

[21] Appl. No.: 381,986

[22] PCT Filed: Jun. 20, 1994

[86] PCT No.: PCT/GB94/01329

§ 371 Date: Jun. 14, 1995

§ 102(e) Date: Jun. 14, 1995

[87] PCT Pub. No.: WO95/00777

PCT Pub. Date: Jan. 5, 1995

[30] Foreign Application Priority Data

Jun. 22, 1993 [GB] United Kingdom ............... 9312856

[51] Int. Cl.$^6$ ........................................... F16H 35/04
[52] U.S. Cl. ............................................................. 74/650
[58] Field of Search .................................................. 74/650

[56] References Cited

U.S. PATENT DOCUMENTS

| | | |
|---|---|---|
| 1,886,837 | 11/1932 | Robbins . |
| 2,034,318 | 3/1936 | Wales . |
| 2,790,334 | 4/1967 | Wildhaber ............... 74/650 |
| 2,873,619 | 2/1959 | Wildhaber ............... 74/650 |
| 5,461,941 | 10/1995 | Young ............... 74/650 |

FOREIGN PATENT DOCUMENTS

| | | |
|---|---|---|
| 76388 | 4/1983 | European Pat. Off. . |
| 284329 | 9/1988 | European Pat. Off. . |
| 326289 | 8/1989 | European Pat. Off. . |
| 376474 | 7/1990 | European Pat. Off. . |
| 741812 | 10/1944 | Germany . |

OTHER PUBLICATIONS

"Automobile Engineering", No. 6, Jun. 1993, pp.27–30, A New Type of Limited Slip Differential.

*Primary Examiner*—Dirk Wright
*Attorney, Agent, or Firm*—Paul E. Milliken; Lee A. Germain

[57] ABSTRACT

A differential mechanism has two output cam members rotatable about an axis, each cam member having a single annular cam surface of undulating wave form comprising equal numbers of pairs of mutually inclined surfaces. A plurality of cam followers having end surfaces engage the cam surfaces of the output cam members, the arrangement being such that relative contra rotation of the output cam members causes the cam followers to slide axially. At least two different types of cam followers are provided and the number of followers is an integer multiple of the number of pairs of inclined surfaces. An input member slidably supports the followers and moves the followers circumferentially relative to the output cam members. Arrangements are also disclosed for pumping oil into the differential and for locking up the differential.

31 Claims, 12 Drawing Sheets

DIFFERENTIAL MECHANISM

The invention relates to a differential mechanism particularly but not exclusively for use in motor vehicles.

Differential mechanisms commonly used on vehicles are of the sun and planet gear type and have a well known disadvantage that when one wheel is on a slippery surface such as mud or ice and the other wheel is on a firm surface capable of providing traction, the first wheel will simply spin as it receives all the available power transmitted to the differential.

Limited slip differential mechanisms have been proposed in an attempt to overcome this problem which restrict the extent to which one wheel can spin relative to the other but such differentials are more complex and, therefore, most costly to produce.

In the Applicant's European patent application EP-A-0326289 there is proposed an alternative differential mechanism comprising two output cam members rotatable about an axis, each said member having a single frustoconical cam surface thereon of undulating form comprising pairs of mutually inclined surfaces, one of said cam members having a different number of said pairs of inclined surfaces thereon than the other of said cam members, and a plurality of cam followers having end surfaces engaging the cam surfaces of the output cam members, the arrangements being such that relative contra rotation of said output cam members causes the cam followers to slide axially, and an input member which slidably supports the followers and moves the followers circumferentially relative to the output cam members.

A problem associated with the above differential is that because of the different numbers of inclined faces on the two cam members the differential has different torque ratios when cornering in one direction as compared with cornering in the other direction.

According to the present invention there is provided a differential mechanism comprising two output cam members rotatable about an axis each said member having a single annular cam surface thereon of undulating wave form comprising pairs of mutually inclined surfaces, an equal number of said pairs of inclined surfaces, a plurality of cam followers having end surfaces engaging the cam surfaces of the output cam members, the arrangement being such that relative contra rotation of said output cam members causes the cam followers to slide axially, and an input member which slidably supports the followers and moves the followers circumferentially relative to the output cam members, characterised in that the cam members have equal numbers of pairs of inclined surfaces thereon and there are at least two different types of cam followers and the number of cam followers is a multiple of the number of pairs of inclined surfaces, where the multiple is an integral greater than one.

Preferably the integer is two and the number of cam followers is a multiple of four, the or each group of four cam followers comprising two different pairs of cam followers, and the two cam followers in each pair are adjacent each other.

When there are more than two different types of cam followers, the followers of each pair may be interspaced with the other types of follower in such a way that followers of the same type are contacting different relative positions on the respective cam surfaces. This is achieved by having an even number of other followers in between the members of each pair of followers. For example with three or five types of followers these may be assembled sequentially, rather than in pairs. The total number of followers is then a multiple of twice the number of different types of follower.

Preferably, where there are two different types of followers, the mutually inclined surfaces which constitute each pair of surfaces are symmetrically arranged, and the cam follower of one pair of cam followers are a mirror image in plan view of the cam followers of the other pair of cam followers.

Alternatively the mutually inclined surfaces which constitute each pair of surfaces are asymmetrically arranged, and the cam followers of one pair of cam followers are in plan view an inversion of the other pair of cam followers.

Preferably the cam followers form a substantially continuous annular array with adjacent cam followers in close proximity.

Preferably the cam followers do not contact each other having a working clearance therebetween.

Differential mechanisms in accordance with the invention will now be described, by way of example, with reference to the accompanying drawings in which:

FIGS. 3(a–d) are developments of symmetrical cam surfaces with cam followers shown in positions therebetween at different relative displacements along the cam surfaces;

FIG. 7 is a development of asymmetrical cam surfaces with cam followers shown in position there between;

FIG. 9(a–d) are developments of symmetrical cam surfaces with 3 pair of followers per group;

Figure 1:
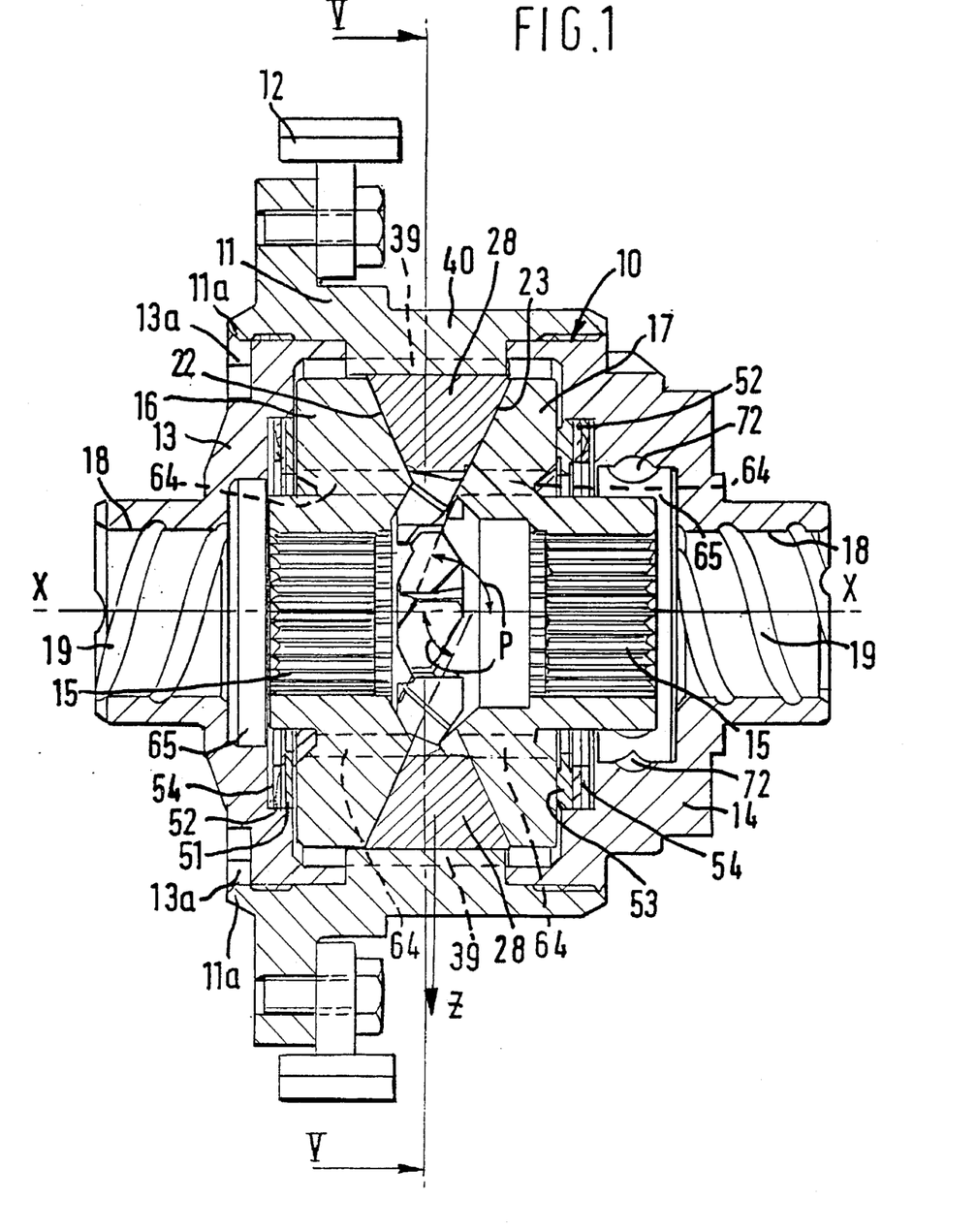
FIG. 1 is a cross section through a differential mechanism in accordance with the invention taken through output cam members.
Figure 2:
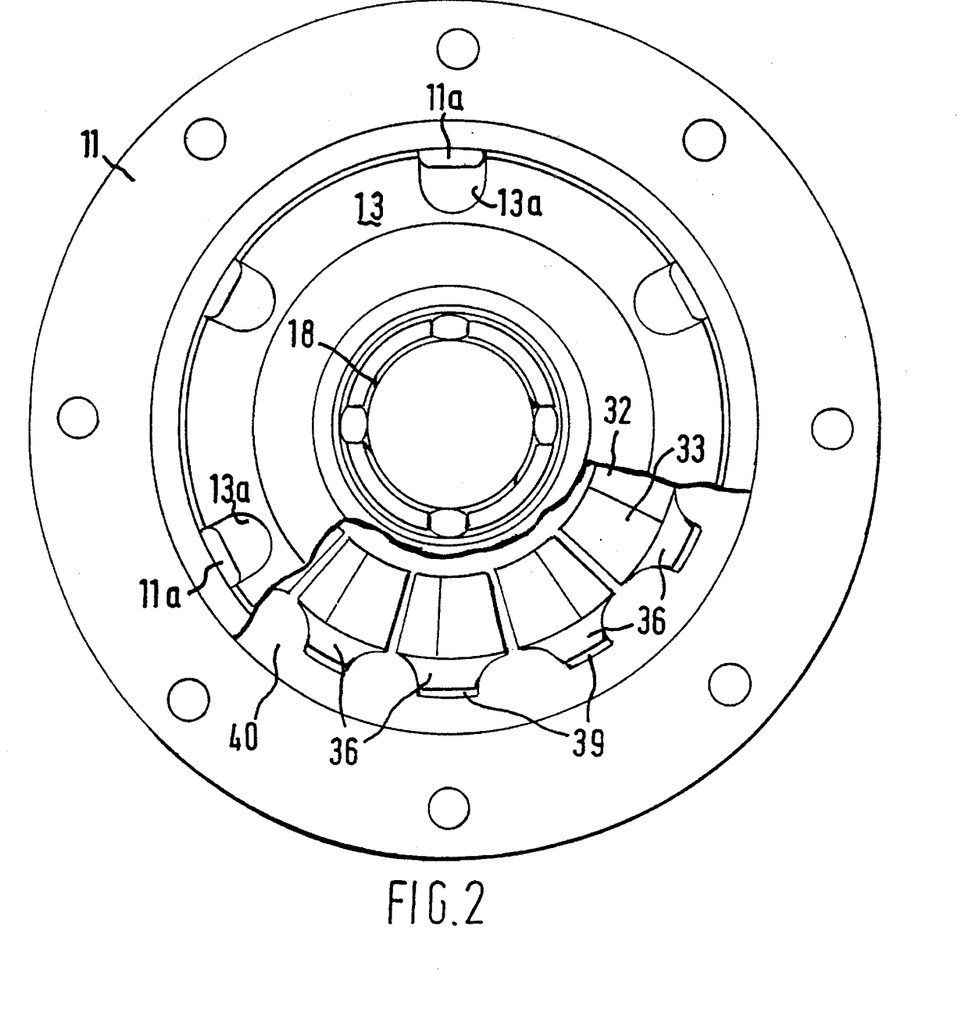
FIG. 2 is an end view of the differential of FIG. 1 shown partly broken away.
Figure 3:
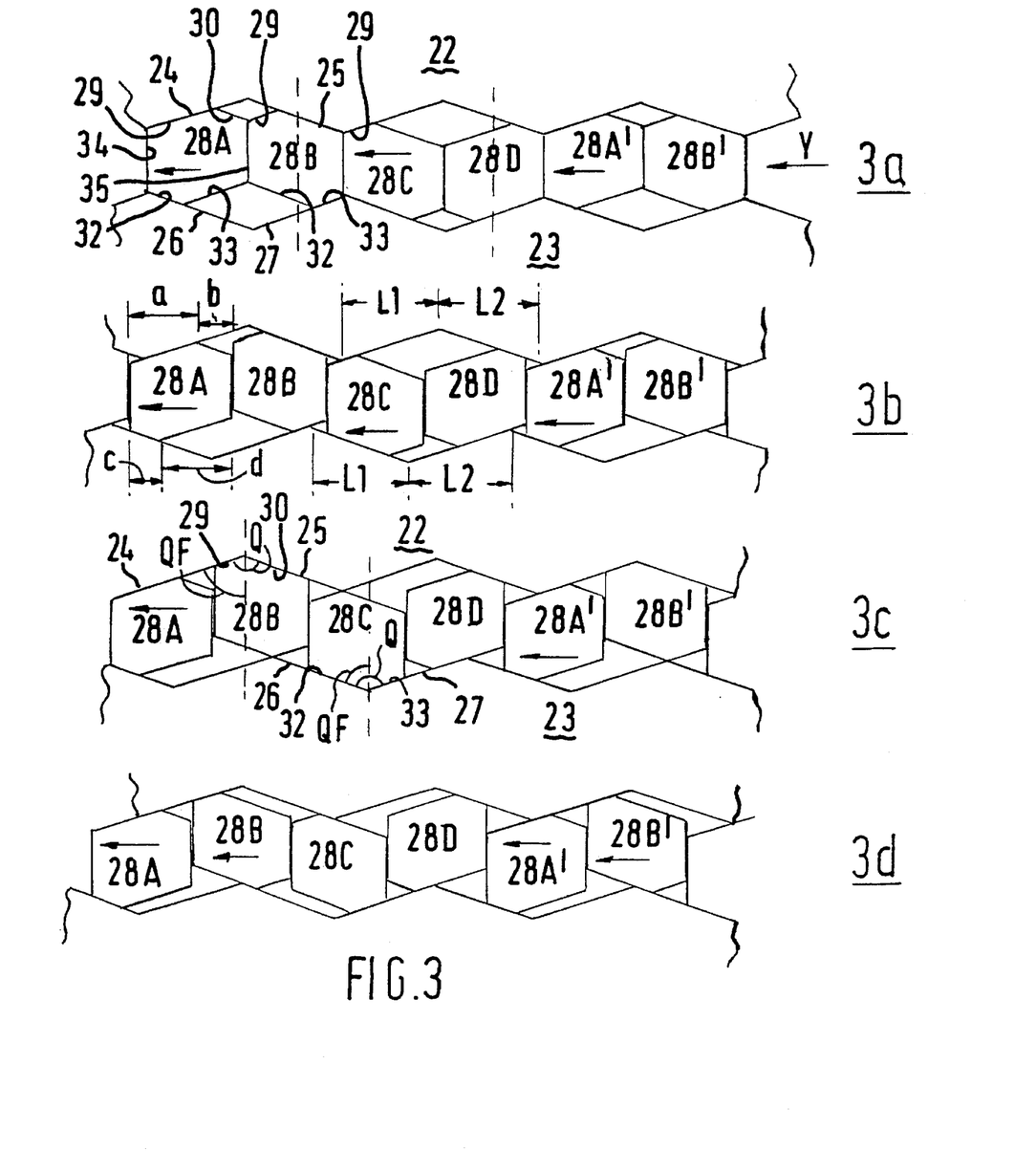

In FIGS. 1 to 3 the differential 10 is mounted in a partially oil filled surrounding casing (not shown) by bearings (also not shown). The differential 10 comprises a housing 11 having a gear 12 on its external surface which receives drive from a pinion (not shown) in known manner. The gear 12 is drivably connected to end walls 13, 14 which may be formed integrally of the housing 11 or maybe formed separately and held in the housing 11 by any suitable means such as screwing into the housing 11 and then locking in position, peening, welding and circumferentially spaced bolts. In the construction disclosed areas 11a of the housing are deformed into cut-outs 13a and 14a in end walls 13 and 14 to lock the housing 11 and end walls together.

Two output cam members 16, 17 have splines 15 at the centre thereof to drive output shafts (not shown) extending through bores 18 in the end walls 13, 14. The bores 18 each have a helical oil feed groove 19 on the inner surface thereof in use to feed lubrication into or out of the differential. Other means of feeding and lubricating the differential will be described later.

The output members 16, 17 maybe supported for rotation about an axis X within end walls 13 and 14 in bearings (not shown). Alternatively, as shown, no such bearings may be used since the design does not produce any significant radial misalignment forces on members 16 and 17. The output members 16, 17 each have a respective undulating cam surface 22, 23 thereon which comprises a frustoconical undulating surface. The cam surface 22 comprises an annular zigzag surface shown in detail in FIG. 3 made up from a number of pairs of mutually inclined helical surfaces 24, 25. The cam surface 23 also comprises an annular zigzag surface apparent from FIG. 3 having the same number of pairs of mutually inclined helical surfaces 26, 27 as used on surface 22.

As shown in FIG. 1 the undulating cam surfaces 22 and 23 are inclined at an angle P to the axis x—x whereby each cam surface converges radially inwardly towards the other.

Cam followers 28 are positioned between the cam surfaces 22, 23. Each cam follower is of strut-like elongate form and comprises two sets of mutually inclined end surfaces 29, 30, 32 and 33 which terminate at the side surfaces 34, 35 (See FIG. 3). The angle of inclination Q (see FIG. 3C) between the end surfaces 29, 30 corresponds to the angle of inclination between the mutually inclined surfaces 24, 25. The angle of inclination between the end surfaces 32, 33 corresponds to the angle of the inclination between the mutually inclined surfaces 26, 27 and is also equal to angle Q. The end surfaces 29, 30, 32 and 33 are also inclined at angle P as is apparent from FIG. 1. When viewed from the end each cam follower is arcuate which enables the followers to be assembled together in an annular array as viewed in FIG. 2. Each cam follower has an arcuate embrace of substantially 360/nf degrees where nf is the number of cam followers. Preferably, the arcuate embrace may be less to leave clearance spaces 28' (see FIG. 4) between the followers thus preventing drive by abutment between adjacent followers.

Figure 4:
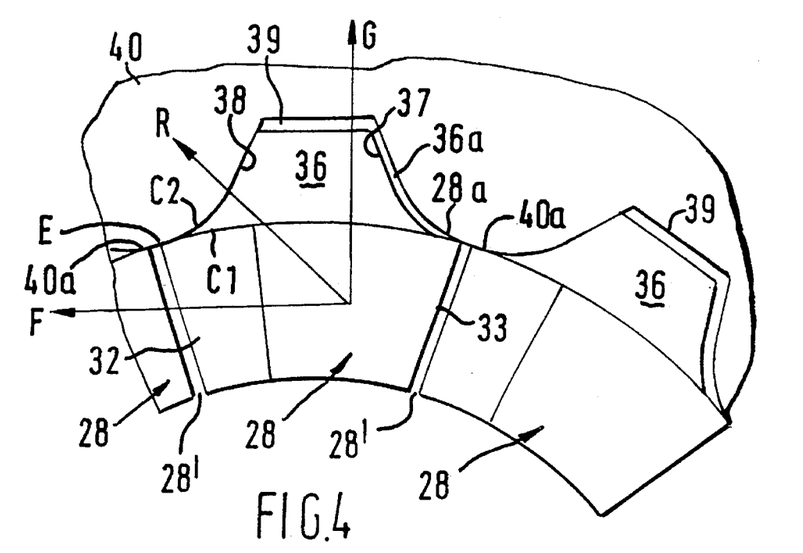
FIG. 4 is a diagrammatic end view of a follower.

Each cam follower includes an elongate drive dog 36 having mutually inclined side surfaces 37, 38 (FIG. 4). The drive dogs 36 locate with slight clearance 36a in complementary shaped grooves 39 formed in the inner periphery of a cylindrical drive input element 40 formed on input housing 11. The clearance 36a is just sufficient to ensure that the arcuate outer periphery (indicated at 28a) of each follower 28 can abut the inner peripheral surface (40a) of the drive input element 40. The grooves 39 provide support for the followers 28 at least adjacent their axial ends and preferably, as shown for substantially their entire length.

As apparent from FIGS. 2 and 4 the assembly of the cam followers 28 is preferably such as to place the side surfaces 34, 35 of adjacent followers so that they interengage or lie closely adjacent. In that way maximum use is made of the available circumferential space for the cam followers, the followers together forming a substantially continuous and compact annular array as viewed in FIG. 2.

As is best seen in FIG. 3, the cam surfaces 22, 23 are identical having symmetrical pairs of inclined surfaces 24, 25 and 26, 27 respectively which are both inclined relative to each other at angle Q. The drive surfaces 24, 26 are a circumferential length L1 which is equal to the circumferential length L2 of the overrun surfaces 25, 27. Thus output cam member 16 and 17 with their equally inclined surfaces 24, 25 and 26, 27 will give an equal bias or torque ratio for cornering in either direction, in both the forward or reverse drive directions.

In order that the cam followers 28 cannot shuttle through the gap between an opposed peak and an opposed trough on the undulating cam surfaces 22, 23 without providing drive, it is necessary for different cam followers to be provided.

The different types of cam followers are arranged such that the number of followers is a multiple of a single wave length. For example, in this case there are two cam followers per wave length (one wave length being the distance spanned by each pair of mutually inclined surfaces 24, 25 and 26, 27).

Preferably the cam followers 28 are provided in groups of four followers 28A, 28B, 28C, 28D. The followers 28 have peaks which are offset from a reference line, in this case the centre line of each follower.

Figure 5:
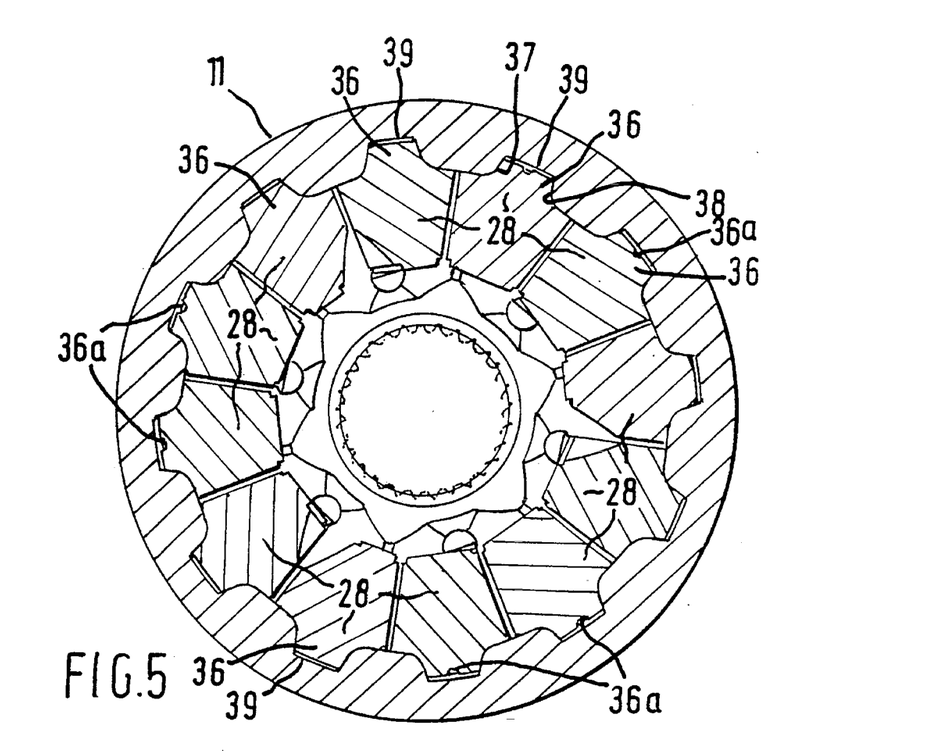
FIG. 5 is a section on line V—V of FIG. 1.
Figure 6:
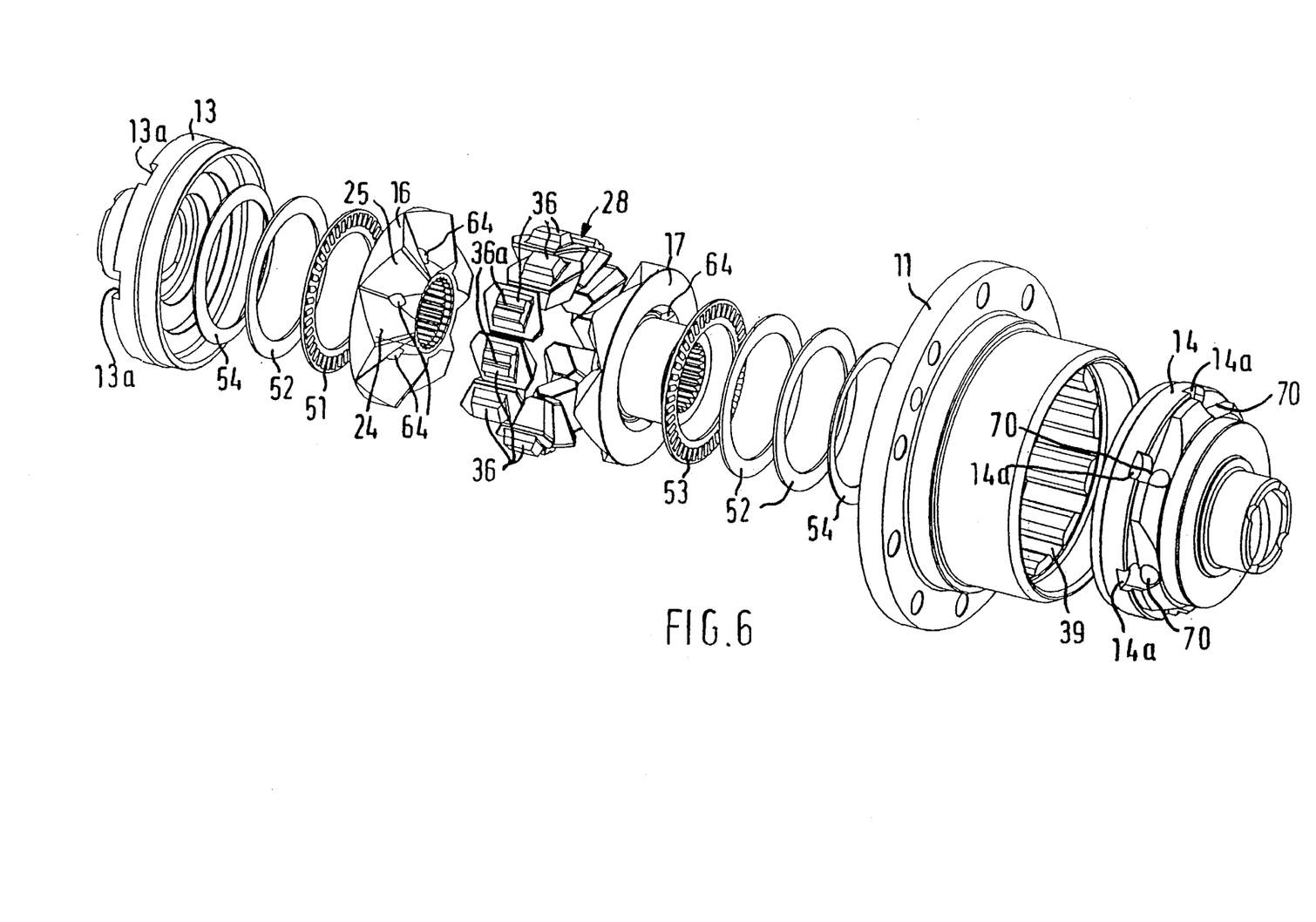
FIG. 6 is an exploded perspective view of the differential of FIG. 1.

The followers 28A and 28D are identical and the followers 28B and 28C are identical, the follower 28B being a mirror image (in plan view only) of the adjacent follower 28A and the follower 28C being a mirror image of the adjacent follower 28D. Followers 28A' and 28B' are in the next group. There are therefore two types of follower and to assist recognition of the different types, one type of follower has its drive dogs 36 grooved at 36a (See FIGS. 5 and 6).

In FIG. 3a the followers 28A and 28C provide drive, whilst the followers 28B and 28D take the load in reverse.

When drive input is applied through drive input housing 11, and assuming that a vehicle having the differential is being driven in a straight line, the cam followers apply a load to cam surfaces 22, 23 so as to rotate the output cam members 16, 17 at equal speeds. As is apparent from FIG. 3, with a driving load applied in direction Y the cam follower 28A on the extreme left has its end surfaces 29, 32 in driving engagement with surfaces 24, 26 and alternate followers are similarly in driving engagement with the cam surfaces 22, 23. However, intermediate cam followers have their surfaces in non-driving engagement with the cam surfaces as discussed above.

The driving force applied by the followers 28 to the inclined surfaces 24, 26 produces a reaction force F as illustrated in FIG. 4. The inclination of the end surfaces of the cam followers at angle P causes the application of forces, which are shown only for cam 22 having the angle P. The application of force F creates an outward force G thereby producing a resultant force R which passes radially outboard of edge E preferably approximately through or adjacent a corner C1 between the drive dog 36 and an adjacent outer peripheral part of the follower 28. In that way the loading on the cam follower tends to wedge it firmly against a corner C2 of the drive input element 40 in such a way that tipping of the follower about its edge E is avoided.

The operation of the differential can be appreciated by reference to FIGS. 3a–3d which illustrate progressive movement of the cam surface 23 in the direction Y relative to the cam surface 22.

The relative movement of the cam surfaces 22, 23 causes the cam followers 28 to move axially and it can be seen in 3c that the followers 28B and 28C are sitting on a cam peak on cam surfaces 23 and 22 respectively and provide no drive. The follower 28A is providing drive whilst the follower 28D is available to take overrun or reverse loading.

Because of the off set follower design when the peaks and troughs are opposite each other, as in FIG. 3d, the followers 28 cannot shuttle through. The followers 28A, 28B in each set provide drive, whilst the followers 28C and 28D can take reverse loads. The diagrams 3a–3d show progressive relative movement over half a wave. The other half of the movement would be similar.

In all situations the cam followers take drive load although the sum of the areas available for load bearing is not constant with the minimum load bearing area available being dependant upon the offset of the cam follower tips from the centre line.

The length (and hence area) of the follower drive faces 29 and 32 (which engage the inclined surfaces 24 and 26 respectively) are in a ratio a/b and c/d in relation to the length of the overrun follower faces 29 and 33, which engage the inclined cam surfaces 25 and 27 respectively. Typically the ratio of a/b is about 2:1 and the ratio c/d is about 1:2, where a=d and b=c.

There are provided four cam followers for two cam waves and for a radially balanced design at least four cam waves are provided on each output cam member.

Designs using either eight or twelve cam followers are preferred.

As there is a considerable amount of friction between the followers 28 and the cams; torque will be transmitted to one cam when the other is drivably connected to a wheel spinning on a slippery surface, which is highly advantageous over conventional differential systems. The moving of one wheel faster than the other will result in a reduction in net torque applied to that wheel through the associated cam due to the load applied by the axially moving cam followers to which input torque is applied. There will be, in that case, an increase in the net torque applied at the other cam and the ratio between the net torques will be dependent upon the value of the portion QF of angle Q (i.e. the torque bias ratio when driving depends on the inclination of the driving surfaces 24,26 (angle QF) and the torque bias ratio when on the overrun depends on the inclination of the overrun surfaces 25,27 (angle Q-QF). The greater the angle QF, the greater will be the friction at the cam surfaces during driving due to axial loading applied thereto by the followers. The angle QF is normally selected whereby the cam surfaces 22, 23 may drive the cam followers axially and axial movement of the cam followers can still drive the face cams.

Needle bearings 51 and 53 are located between the output cam member 16 and 17 and the end walls 13 and 14 and are supported on, if necessary, shims 52 for setting the required axial position of the cam 23.

Axial thrust applied to the cams 16, 17 by the followers 28 is transmitted to the end wall 13 and 14 through the bearings 51 and 53. A belleville washer 54 is arranged to act against each shim 52 to urge the followers 28 into firm engagement with the cam surfaces 22, 23. The urging of the followers against the cam surfaces also creates a radially outward force Z on the followers 28 resulting from the angle of inclination P in addition helping to reduce backlash.

The needle bearings 51 and 53 described above may be replaced by plain bearings. If an equal torque bias is required during cornering in either direction the bearings 51 and 53 will be of the same type.

Figure 7:
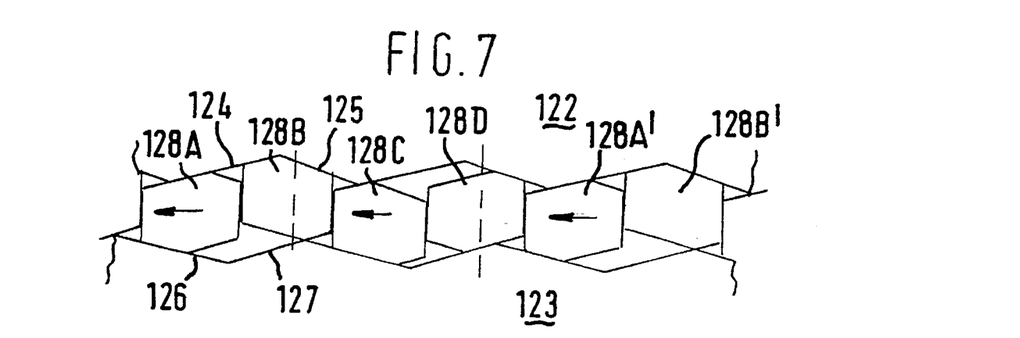
Figure 8:
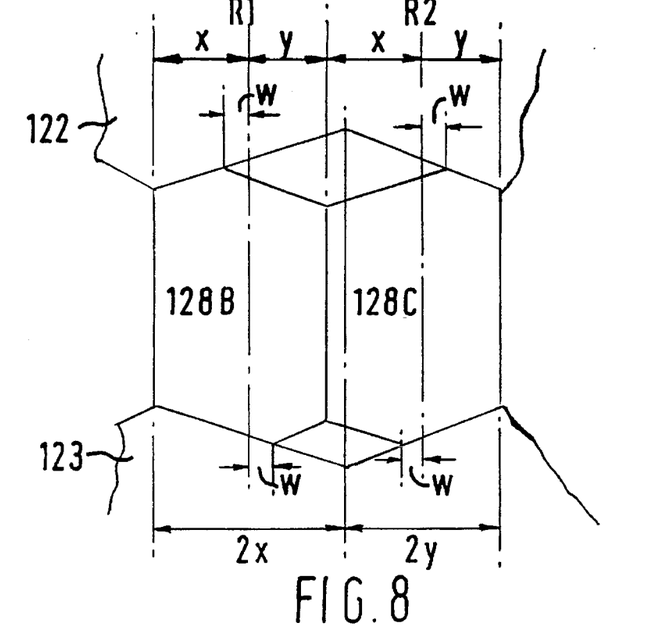
FIG. 8 is an enlargement of a portion of FIG. 7.

FIG. 7 and FIG. 8 show an alternative cam design in which the cams 122 and 123 are asymmetrical. Cams 122,123 have asymmetrical pairs of inclined surfaces 124, 125, 126, 127 respectively. Asymmetric cams may be used to provide more drive area and/or different drive and overrun characteristics.

In FIG. 7 the followers 128A, 128B, 128C, 128D, 128A', 128B' are shown in plan view and the followers 128A, 128D, and 128A' are identical as are the followers 128B, 128C and 128B'. The followers 128A, 128D and 128A' in plan only are an inversion of the followers 128B, 128C and 128B'.

The asymmetry of the cams 122 and 123 is chosen, in this particular example, so that the drive surfaces 124, 126 are in a ratio of 4:3 with the overrun surfaces 125, 127. When the degree of ratio of asymmetry has been selected.

The design of the follower is determined as shown in FIG. 8.

For a pair adjacent cam followers 128B, 128C imaginary reference lines R1, R2 are drawn so that each line R1, R2 is a distance x from the leading edge of the respective follower where x is related to half the length 2x of the cam drive face. (This only holds true where the cam followers 128 form a substantially continuous annular array).

Alternatively, when the followers are spaced apart but still have a pitch therebetween of one half of a wave form, the position of the reference line is given by the formula, x/x+y where 2x is, as before, the circumferential length of the drive face of the cam and 2y is the circumference length of the overrun face of the cams.

Hence, the reference lines R1 and R2 are a distance x from the leading edge of the follower, and a distance y from the trailing edge of the follower. The lengths x:y are in the ratio of 4:3 in the example shown.

The peaks of the followers are then offset by a distance 'w' which is chosen for the minimum wear of contact areas in drive and reverse during relative rotation of the two cams. In the example shown w is typically about 20% of the follower circumferential length (x+y).

FIG. 9 shows a pair of symmetrical cams 222, 223 having the cam followers arranged in groups of six followers 228A–F and 228A'–F' each group of followers including 3 pairs of followers with the members of each pair circumferentially adjacent. The followers are similar to those described with reference to FIG. 3 except that two pairs of symmetrical followers 228E, 228F and 228E', 228F' have been introduced between the pairs of different off-set followers 228A–228D and 228A'–228D'.

Figure 9A:
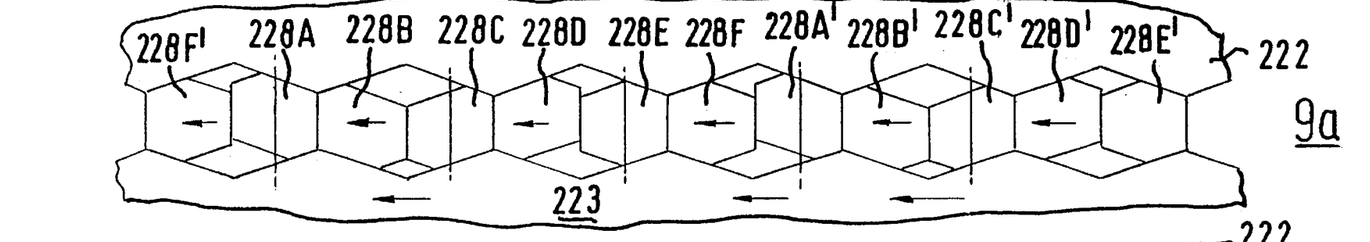
Figure 9B:
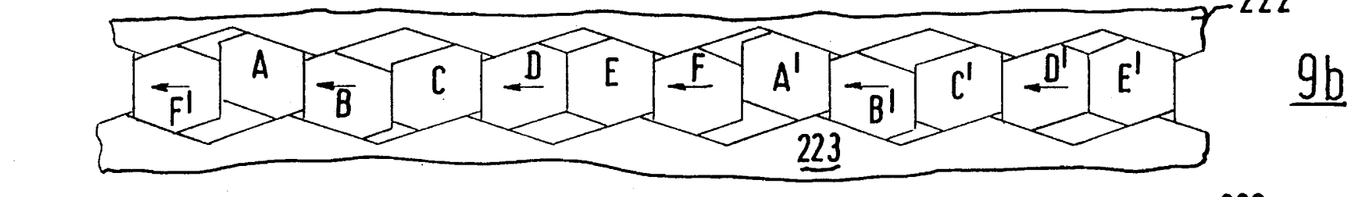
Figure 9C:
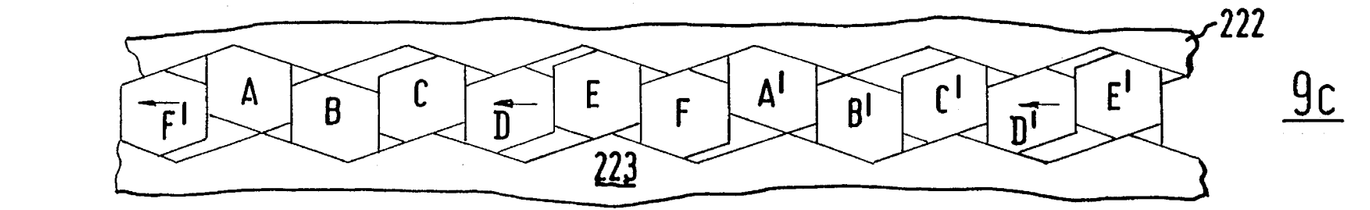
Figure 9D:
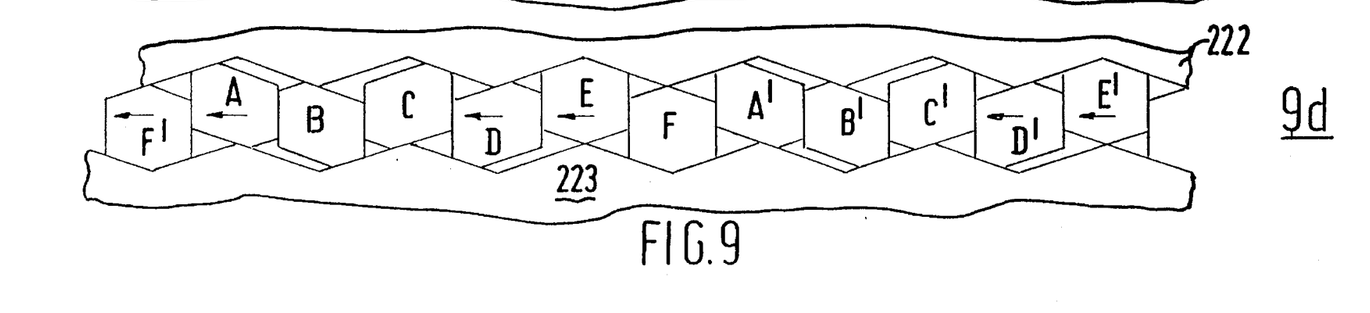

In a still further alternative arrangement the cam followers of FIG. 9 may be arranged in the following circumferentially adjacent sequence 228A, 228C, 228E, 228B, 228D, 228F, 228A', 228C', 228E', 228B', 228D', 228F'. In this sequence the members of each pair are not circumferentially adjacent.

The differential designs described above incorporate a means of lubricating the inside of the differential. A set of oil passageways 64 connect the cam surfaces 22 and 23 with a gallery 65 at the rear of each output cam member. As can be seen from FIG. 6 these passageways open into the troughs formed between pairs of mutually inclined cam surfaces 24,25 and 26,27.

The end wall 14 is provided on its outer surface with oil pump means 70 in the form of integral scoops which are connected with gallery 65 via angled passageways 71 (see FIG. 10) which emerge into gallery 65 via openings 72 (see FIG. 1).

Figure 10:
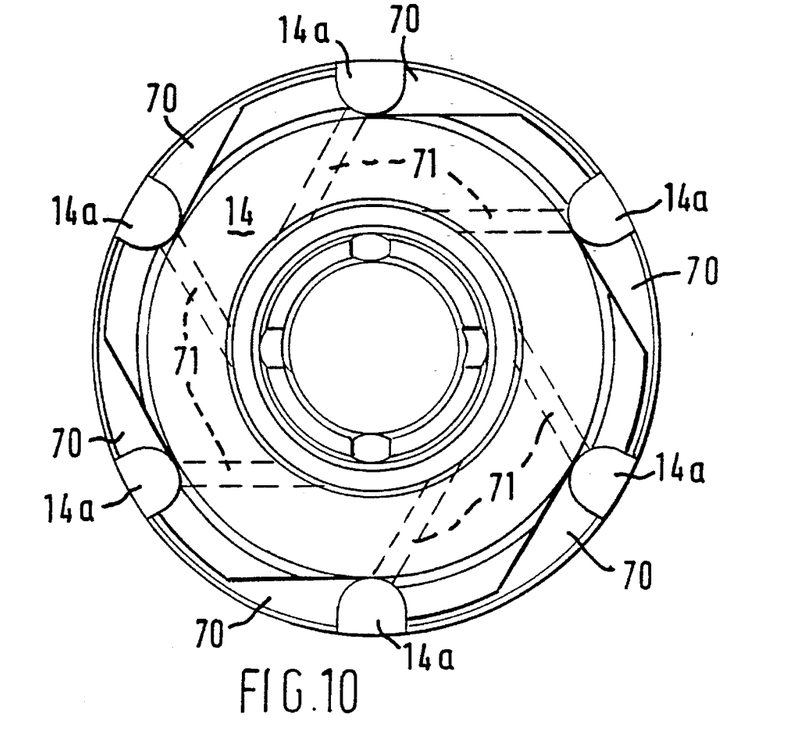
FIG. 10 is a view of an end wall of the differential of FIG. 1 showing pumping scoops.

As end wall 14 rotates scoops 70 force oil from within the surrounding casing down passageways 71 into gallery 65 behind output member 14. The oil then flows through passages 64 in output cam member 17 and emerges between cam surfaces 22,23 from where it flows radially outwardly to the regions outboard of output members 16 and 17 and also into gallery 65 behind output cam member 16 via passages 64 in member 16. Oil also flows radially outwardly via bearings 51 and 53. This fills all the free volume of the differential and any oil which leaks out of the differential, for example by flowing radially inwardly between cam surfaces 22 and 23 and then axially outwardly via helical grooves 19, is replenished by further oil forced into the differential via scoops 70.

Figure 11:
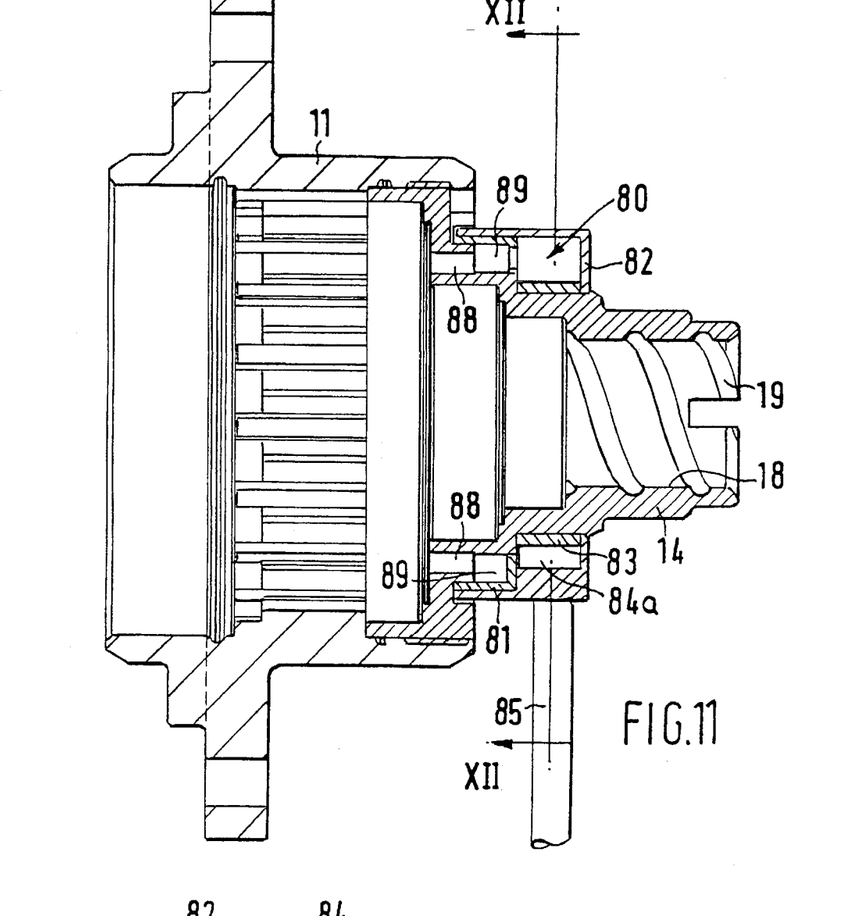
FIGS. 11 and 12 show details of an oil pump arrangement which may be used with the differential of FIG. 1.
Figure 12:
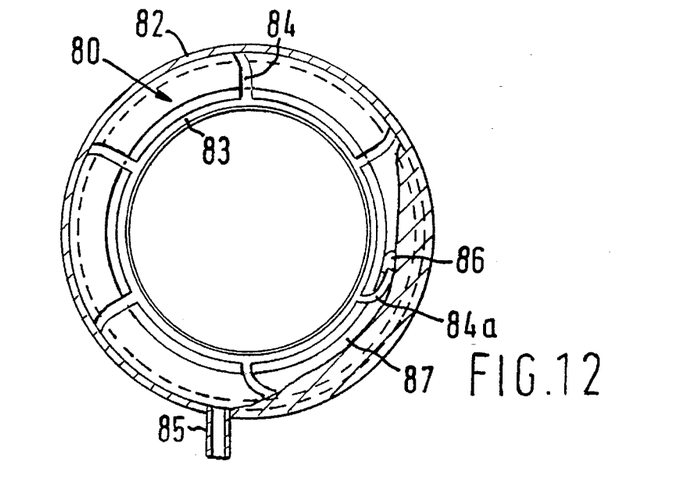

FIG. 11 and 12 show a further alternative lubricating arrangement in which the external scoops 70 are replaced by a pump 80 which surrounds and is driven from the end wall.

Pump 80 comprises a non rotatable housing having an inner part 81 and an outer part 82 and an impellor having a central cylindrical band 83 which encompasses the end wall 14 and vanes 84 which extend radially outwardly from the band at circumferentially spaced locations. The impellor is moulded from rubber or plastics material so that vanes 84 are flexible.

As can be seen from FIG. 12 a pick-up pipe 85 which receives oil from within the surrounding casing provides the inlet to pump 80 and also, by its connection with a non-rotating portion of the differential casing, resists any tendency for the pump housing to rotate.

An exhaust port 86 from the pump housing is connected with an annular collection reservoir 89 from which extend passageways 88 which open into gallery 65 to feed passageways 64 etc. as in the previous construction. Between inlet pipe 85 and exhaust port 86 the cross section of the pump decreases at 87 to produce the change in volume which provides the pumping action. The pump vanes flex, as shown at 84a, when passing through the decreased cross-section portion 87 of the pump.

The cylindrical band portion 83 of the impellor may be a friction grip on end wall 14 or may be positively driven by interengaging formations on the band and end wall or by other fasteners between the band and end wall.

The pump 80 is designed to fill the differential with oil and maintain a steady flow of oil through the differential on rotation of housing 11 with any loss of oil from the differential being replenished by the pump.

The differential designs described above may be provided with a lock-up capability as shown in FIGS. 13 to 15 and 16.

Figure 13:
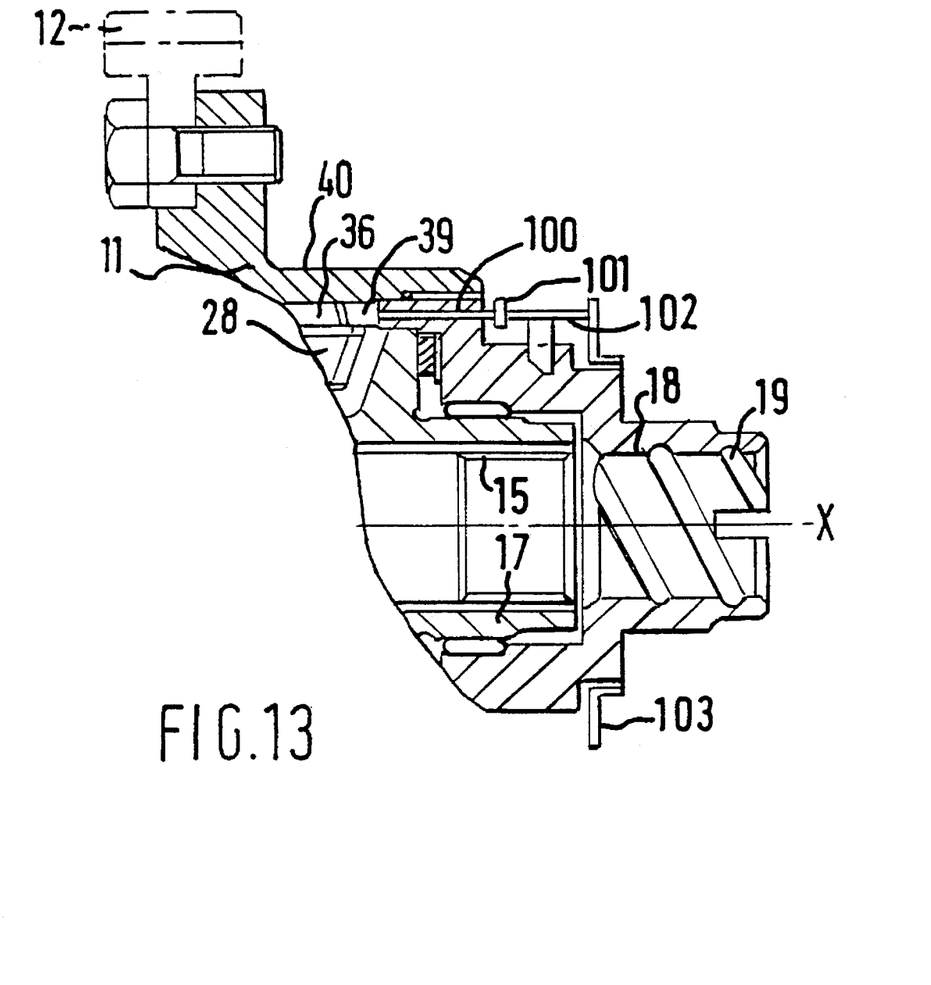
FIGS. 13 and 14 show details of a differential locking arrangement which may be used with the differential of FIG. 1.
Figure 14:
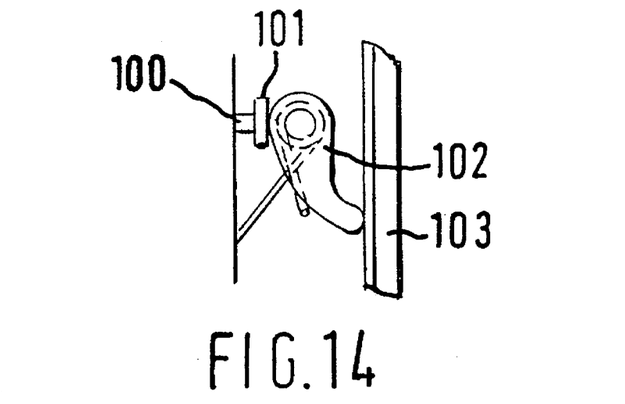

One method of locking is shown in FIGS. 13 and 14 in which a pin 100 is mounted in the end wall 14 and is axially slidable therein. The pin has a head 101 which is engagable with a snail cam 102 pivoted externally on the housing 11. The snail cam 102 is operated by a sliding collar 103 to push the pin 100 against a cam follower 28 to limit travel of follower and hence lock up the differential. The snail cam surface is sufficiently shallow to prevent cam follower end loads from forcing the pin back, or alternatively the snail cam surface could go over centre.

The collar 103 could operate more than one pin through a number of similar snail cam devices.

Pin travel should preferably be 25%–75% of the full axial travel of the follower 28 to give adequate contact area on the follower cam surface near the mid stroke position of the follower. Where more than one pin is used then the pin travel may have to be reduced to less than 50% to ensure that all the affected followers can reach the same position together.

Figure 15:
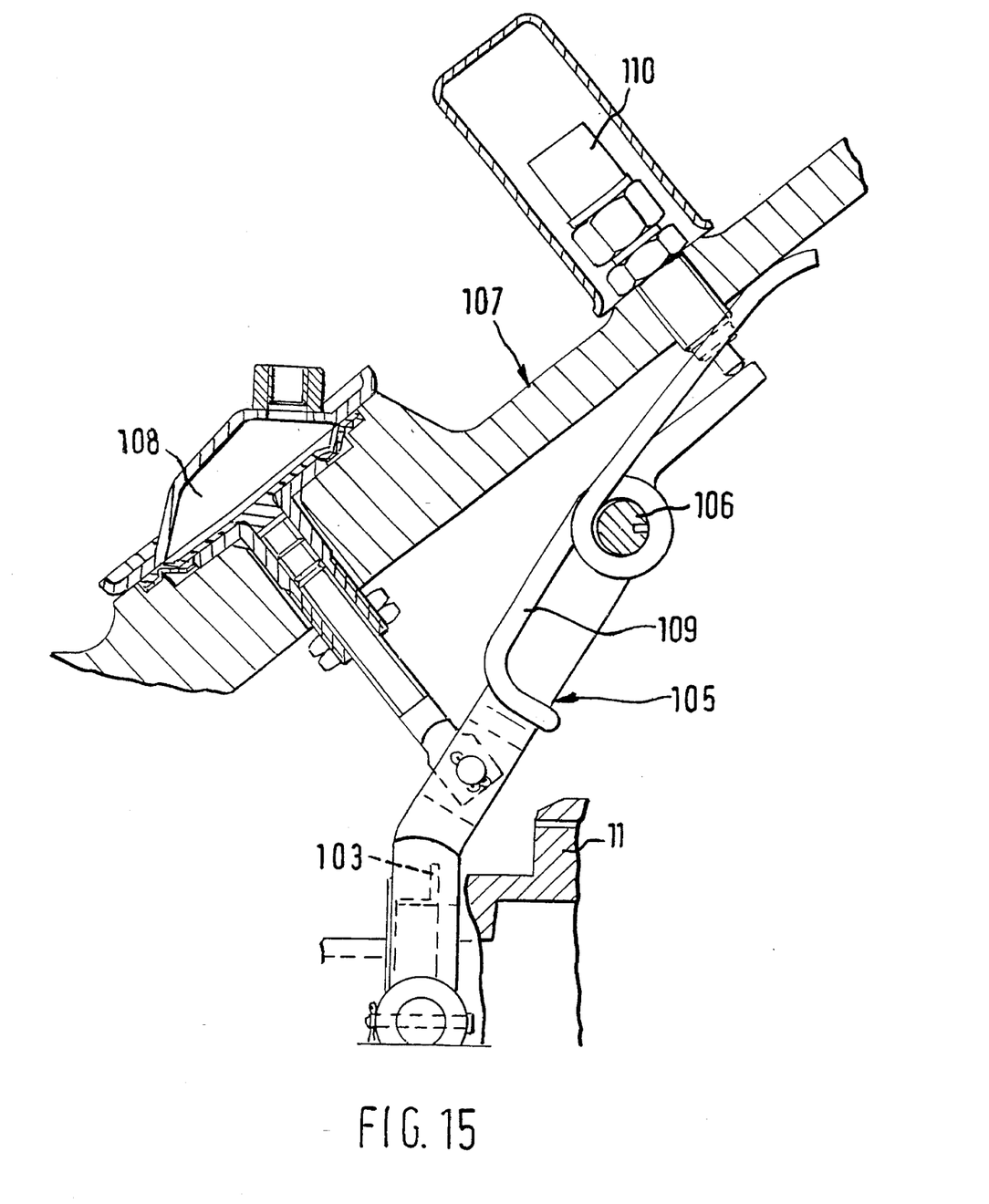
FIG. 15 shows details of a differential lock actuator which may be used in conjunction with the locking arrangement of FIGS. 13 and 14.

With reference to FIG. 15, the collar 103 is moved axially by a fork/lever system 105 mounted by pivot pin 106 on the differential casing 107. The fork is operated by a fluid actuator 108 and on cessation of the operation of the actuator 108 the lever is returned to its position by a return spring 109. A warning device 110 is operated by the fork to indicate when the lock is engaged.

Figure 16:
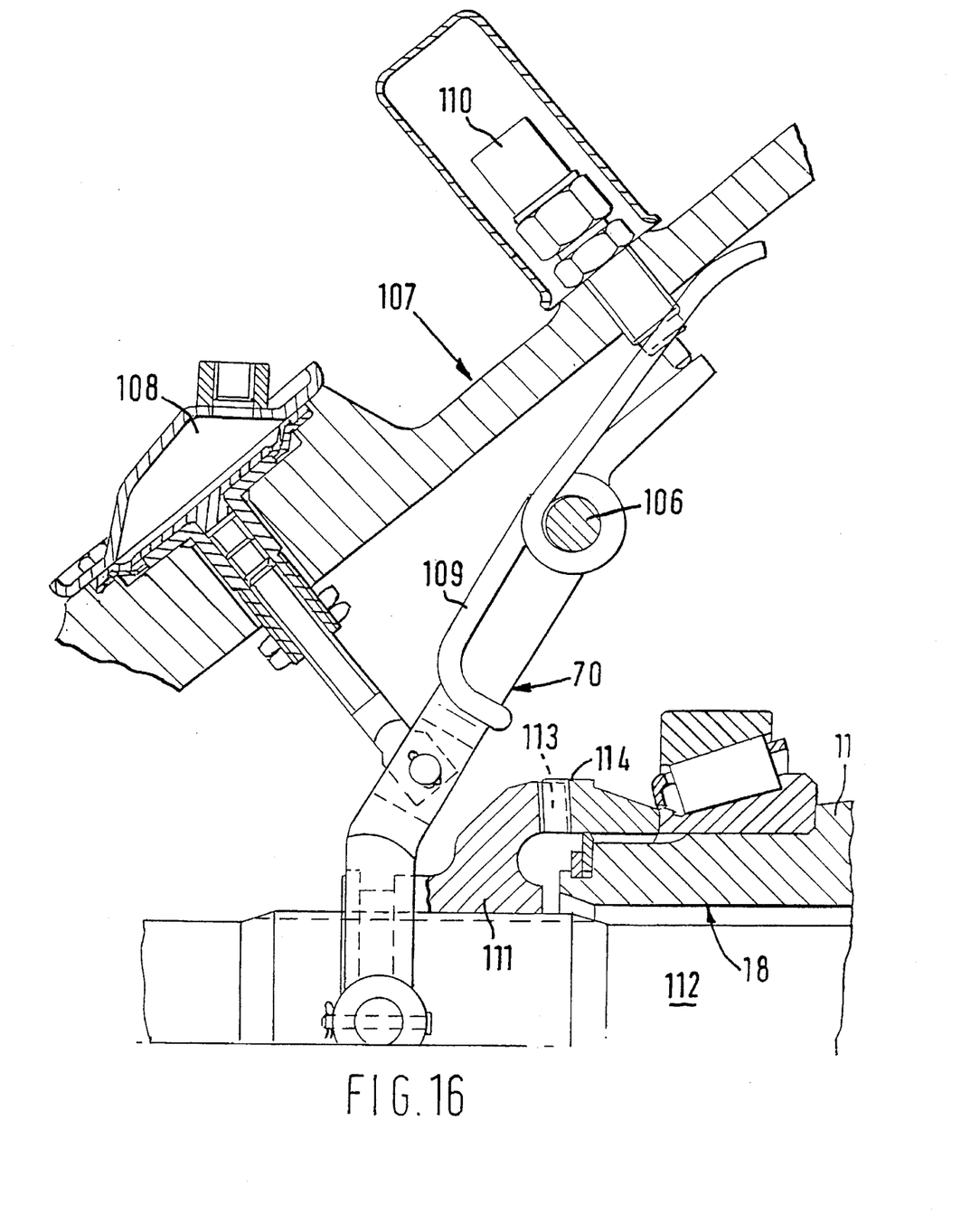
FIG. 16 shows an alternative differential lock arrangement.

FIG. 16 shows an alternative lock means comprising a collar 111 splined onto an output shaft 112 from an output cam 16 or 17. The collar 111 has dog teeth 113 thereon that can engage external teeth 114 that surround the bore 18 in the end wall of the housing 11.

The actuation is as described above for FIG. 15.

In this case the relative rotation of one output member and input is prevented directly by engagement of the collar teeth with the teeth on the end wall of the housing.

In all the differential designs described above the housing 11 acts as the input element of the differential and the outputs are taken from co-axial output cam members 16 and 17.

Figure 17:
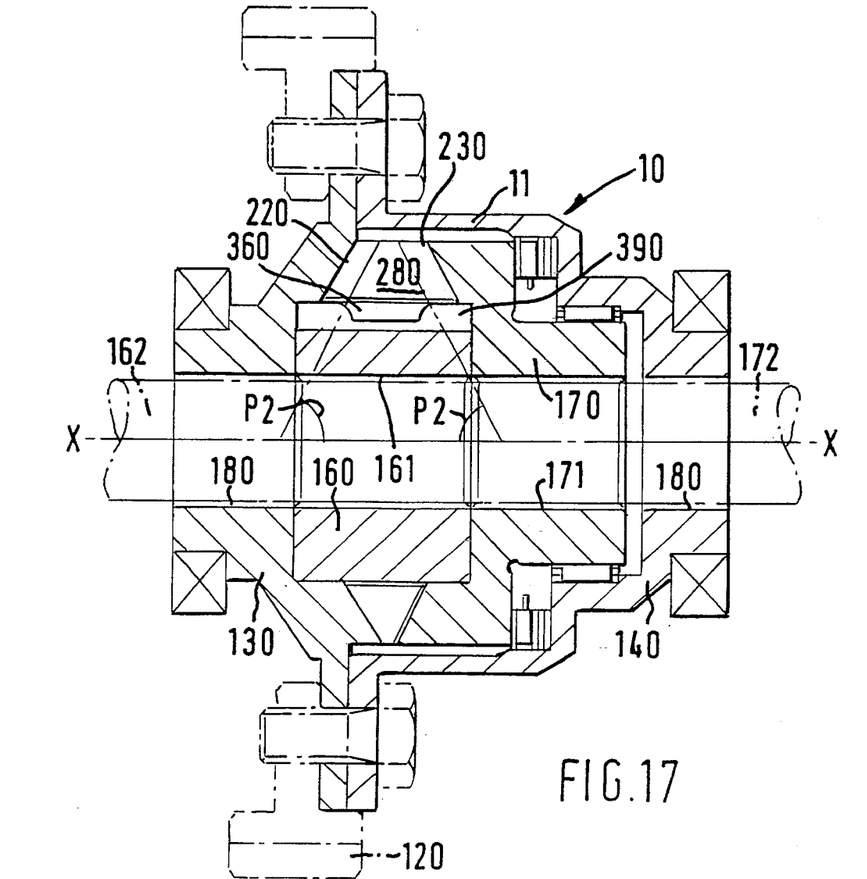
FIGS. 17 and 18 show details of an alternative form of differential in accordance with the present invention which is particularly suitable for use as an inter-axle differential in a four wheel drive vehicle.

In certain applications, for example when the differential is to be used as an inter-axle differential connecting front and rear axles of a four wheel drive vehicle, it may be desirable, as shown in FIG. 17, for the input to the differential to be via an input hub 160 which is connected via splines 161 to an input shaft 162.

An output pinion 170 is connected via splines 171 with an output shaft 172. Shafts 162 and 172 pass through bores 180 in end walls 130 and 140.

The axially inner surface of end wall 130 and the pinion 170 both have cam surfaces 220 and 230 thereon which comprise frustoconical undulating surfaces made up from pairs of mutually inclined helical surfaces similar to surfaces 24, 25 and 26, 27 described in the previous arrangements.

Eight cam followers 280 are positioned between the cams 220, 230. Each follower has a drive dog 360 which engages in a complementary shaped groove 390 in the input hub 160 with clearance 380 and has two sets of mutually inclined end surfaces (similar to surfaces 29, 30 and 32, 33 described in the previous arrangements) which engage the co-operating cam surfaces.

In a typical four wheel drive application input shaft 162 is driven from the engine of the vehicle, output shaft 172 drives the rearwheels of the vehicle and a crownwheel 120 attached to the end wall 130 drives the front wheels of the vehicle.

The cam surfaces 220 and 230 are equally inclined relative to the axis of rotation of shafts 162 and 172 at angle P2 so that surfaces converge relative to each other in a radially outward sense. The equal inclination of surfaces 220 and 230 gives an equal torque split between the front and rear drive wheels.

The cam surfaces 220 and 230 and the followers 280 are all constructed and operate on the same principles as cam surfaces 22, 23 and followers 28 described above except that the input drive for the differential comes from the center of the unit and flows outwardly from hub 160 via followers 280 to cam surfaces 220 and 230 and hence to output elements 120 and 172.

Figure 18:
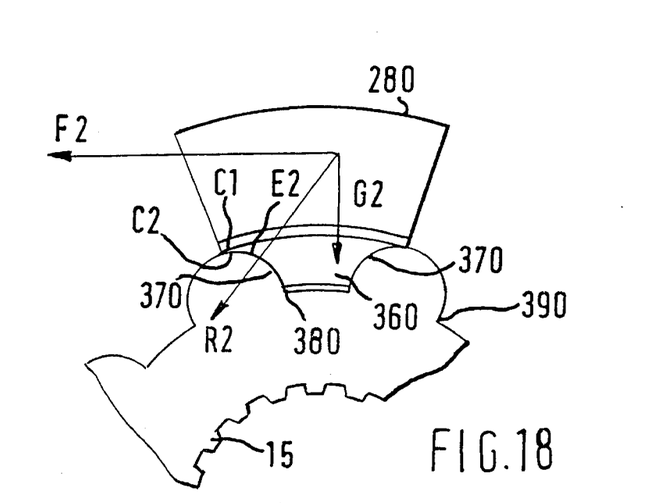

The driving force applied by the followers 280 to the inclined cam surfaces 220 and 230 produces a reaction force F2 on each follower as illustrated in FIG. 18. The inclination of the end surfaces of the cam followers at angle P2 cause the reaction force F2 to create an inward force G2 which gives rise to a resultant force R2 which passes through a curved edge E2 of the associated drive dog 360 to the right of corner C1 of the drive dog. This ensures that the loading on follower 280 tends to wedge it firmly against a rounded corner C2 of the associated drive hub groove 390 thus preventing tipping of the follower about its corner C1.

We claim:

1. A differential mechanism (10) comprising two output cam members (16, 17) rotatable about an axis (X—X) each said member having a single annular cam surface (22, 23) thereon of undulating wave form comprising pairs of mutually inclined surfaces (24, 25:26, 27), a plurality of cam followers (28) having end surfaces (29, 30:32, 33) engaging the cam surfaces of the output cam members, the arrangement being such that relative contra rotation of said output cam members (22, 23) causes the cam followers (28) to slide axially, and an input member (11) which slidably supports the followers and moves the followers circumferentially relative to the output cam members, characterised in that the cam members (16, 17) have equal numbers of pairs of inclined surfaces (24, 25:26, 27) thereon and there are at least two different types of cam followers (28) and the number of followers is a multiple of the number of pairs of inclined surfaces, where the multiple is an integer greater than one.

2. A differential mechanism as claimed in claim 1 wherein the integer is two.

3. A differential mechanism as claimed in claim 1 wherein the number of cam followers (28) is a multiple of four, and the or each group of four cam followers (28B, 28C, 28D, 28A') comprises two different pairs (28B, 28C:28D, 28A') of identical cam followers and the two cam followers in each pair are adjacent each other.

4. A differential mechanism as claimed in claim 3 wherein the mutually inclined surfaces (24, 25:26, 27) which constitute each pair of surfaces are symmetrically arranged, and the cam followers (28B, 28C) of one pair of cam followers are a mirror image in plan view of the cam followers (28D, 28A') of the other pair of cam followers.

5. A differential mechanism as claimed in claim 3 wherein the mutually inclined surfaces (124, 125:126, 127) which constitute each pair of surfaces are asymmetrically arranged, and the cam followers of one pair (128B, 128C) of cam followers are in plan view an inversion of the other pair (128D, 128A') of cam followers.

6. A differential mechanism as claimed in claim 1 wherein the cam followers (28) form a substantially continuous annular array with adjacent cam followers in close proximity.

7. A differential mechanism as claimed in claim 4 wherein the cam followers (28) form a substantially continuous annular array with adjacent cam followers in close proximity and each cam follower (128) has pairs of inclined end surfaces (124,125:126,127) at each end thereof, and the areas of the inclined surfaces in each pair are substantially in the ratio of 2.5 to 1.5:1.

8. A differential mechanism as claimed in claim 5, wherein the cam followers (28) form a substantially continuous annular array with adjacent cam followers in close proximity and each cam follower (128) has pairs of inclined surfaces (124,125:126,127) at each end thereof, comprising a drive surface having a circumferential length a or b and an overrun surface having a circumferential length c or d wherein the lengths a,b,c and d are determined by reference to a datum line (R) which is a distance 'x' from the leading edge of the follower and a distance 'y' from the trailing edge of the follower, where x is one half of the length of the inclined cam drive surface and y is one half the length of the cam overrun surface.

9. A differential mechanism as claimed in claim 8 wherein the ratio x/x+y is between 0.5–0.6.

10. A differential mechanism as claimed in claim 8, wherein the inclined end surfaces (124,125:126,127) on each cam follower (128) intersect at a point whose position is a predetermined distance 'w' from the datum line (R) in either direction.

11. A differential mechanism as claimed in claim 10 wherein 'w' is approx 20% of the circumferential length of the follower (128), when the ratio x:y is approx 4:3.

12. A differential mechanism as claimed in claim 1 wherein the input member comprises an input housing (11), and the output cam members (16,17) are rotatably mounted within the housing.

13. A differential mechanism as claimed in claim 1 wherein the cam surfaces (22,23) are frustoconical and converge (R) radially inwardly towards each other, and the input member (11) engages a radially outer portion (36) of each cam follower (28), and supports the two cam output members (16,17) against axially outward movement during drive of the cam output members through the cam followers.

14. A differential mechanism as claimed in claim 1 wherein the cam surfaces (220,230) are frustoconical and converge radially outwardly (P2) towards each other with the input member (160) engaging a radially inner portion (360) of each cam follower (280).

15. A differential mechanism (10) comprising two output cam members (16,17) rotatable about an axis (x—x) each said member having a single annular cam surface (22,23) thereon of undulating wave form comprising pairs of mutually inclined surfaces (24,25:26,27), a plurality of cam followers (28) having end surfaces (29,30:32,33) engaging the cam surfaces (22,23) of the output cam members (16,17), the arrangement being such that relative contra rotation of said output cam members causes the cam followers to slide axially, and an input member (11) which slidably supports the followers and moves the followers circumferentially relative to the output cam members, characterised in that the cam members (16,17) have equal numbers of pairs of inclined surfaces thereon and the followers (24,25:26,27) are grouped, each group of cam followers (28) comprising at least two different pairs (28A,28B:28C,28D) of cam followers which in each respective group are identical.

16. A differential mechanism as claimed in claim 15 wherein the two cam followers (28A,28B:28C,28D) in each pair are adjacent each other.

17. A differential mechanism as claimed in claim 15 wherein there are at least two groups of cam followers (28) present.

18. A differential mechanism as claimed in claim 15 wherein the cam followers (28) are arranged in groups of four cam followers (28A,28B,28C,28D).

19. A differential mechanism as claimed in claim 15 wherein the cam followers are arranged in groups of six cam followers.

20. A differential mechanism as claimed in claim 15 wherein the groups includes cam followers having symmetrical end faces.

21. A differential mechanism (10) comprising two output cam members (16,17) rotatable about an axis (x—x) each said member having a single annular cam surface (22,23) thereon of undulating wave form comprising pairs of mutually inclined surfaces (24,25:26,27), a plurality of cam followers (28) having end surfaces (29,30:32,33) engaging the cam surfaces of the output cam members, the arrangement being such that relative contra rotation of said output cam members causes the cam followers to slide axially, and an input member (11) which slidably supports the followers and moves the followers circumferentially relative to the output cam members, characterised in that the cam members (16,17) have equal numbers of pairs of inclined surfaces (24,25:26,27) thereon and in that there are at least two different types (28A,28D:28B,28C) of cam followers with two cam followers (28A,28B:28C,28D) for each pair of inclined surfaces (24,25:26,27).

22. A differential mechanism as claimed in claim 21 wherein a component (14) of the differential which rotates during use of the differential drives oil pump means (70) for forcing oil into the differential.

23. A differential mechanism as claimed in claim 22 wherein the oil pump means comprises scoops (70) arranged externally of the component (14) and which are connected with oil passageways (71) through the component.

24. A differential mechanism as claimed in claim 22 wherein the oil pump means comprises an oil pump (80) driven by the component (14) which rotates.

25. A differential mechanism as claimed in claim 24 wherein the oil pump comprises a non-rotatable housing (81,82) containing an impellor (83,84) mounted on an outer surface of the component (14) which rotates.

26. A differential mechanism as claimed in claim 22 wherein the oil pump means (70,80) delivers oil to at least some of the troughs between pairs of inclined cam surfaces (24,25:26,27) via passageways (64) in the output members (16,17).

27. A differential mechanism as claimed in claim 26 wherein locking means (100,101,102,103) is provided for locking at least any two of said input member (11) and said two output cam members (16,17) against relative rotation to lock-up the differential.

28. A differential mechanism as claimed in claim 27 wherein the locking means (100,101,102,103) acts to prevent axial movement of the cam followers (28) and hence rotational movement of the output cam members (16,17).

29. A differential mechanism as claimed in claim 28 wherein the locking means (100) is operated by a cam member (102) which is moved by an axially movable sleeve (103).

30. A differential mechanism as claimed in claim 27 wherein the locking means (111,113,114) is operatively connected with an output cam member (112,16) and is axially movable relative thereto for engagement with the input member (11).

31. A differential mechanism as claimed in claim 27 wherein the locking means (100,111) is operated by a fluid pressure actuator (108).

* * * * *